United States Patent [19]

Sakurai

[11] 4,353,096
[45] Oct. 5, 1982

[54] DIGITAL FACSIMILE SYSTEM TO BAND-COMPRESS HALF-TONE PICTURE SIGNALS

[75] Inventor: Hidekazu Sakurai, Tokyo, Japan

[73] Assignee: Nippon Electric Co., Ltd., Tokyo, Japan

[21] Appl. No.: 81,635

[22] Filed: Oct. 4, 1979

[30] Foreign Application Priority Data

Oct. 5, 1978 [JP] Japan .................................. 53-12324
Apr. 6, 1979 [JP] Japan .................................. 54-41787

[51] Int. Cl.³ ............................................. H04N 7/12
[52] U.S. Cl. .................................... 358/263; 358/138; 358/280
[58] Field of Search ............... 358/138, 260, 261, 262, 358/263, 280

[56] References Cited

U.S. PATENT DOCUMENTS

| 3,882,270 | 5/1975 | Ogawa | 358/260 |
| 3,891,793 | 6/1975 | De Loye | 358/263 |
| 3,902,008 | 8/1975 | Ogawa | 358/263 |
| 4,070,694 | 1/1978 | Sakamoto et al. | 358/260 |

Primary Examiner—Joseph A. Orsino, Jr.
Attorney, Agent, or Firm—Laff, Whitesel, Conte & Saret

[57] ABSTRACT

A digital facsimile system provides band-compression of half-tone picture signals. Primarily, a plurality of analog signals are derived by successively scanning a picture. Thereafter, the analog signals are converted into digital signals and then the digital signals are compressed. Initially, the digital signals are pulse trains of two-level signals, representing the scanned picture, sliced into segments at multi-level quantization levels. Band compression is realized after a plurality of two-level digital pulse trains are compared. Only the differences between corresponding bits, which are found by the comparison, are encoded and transmitted.

4 Claims, 19 Drawing Figures

FACSIMILE TRANSMITTER
SYSTEM

FACSIMILE TRANSMITTER SYSTEM

SYNCH SIGNAL INSERTION

FACSIMILE
TRANSMITTING
SYSTEM

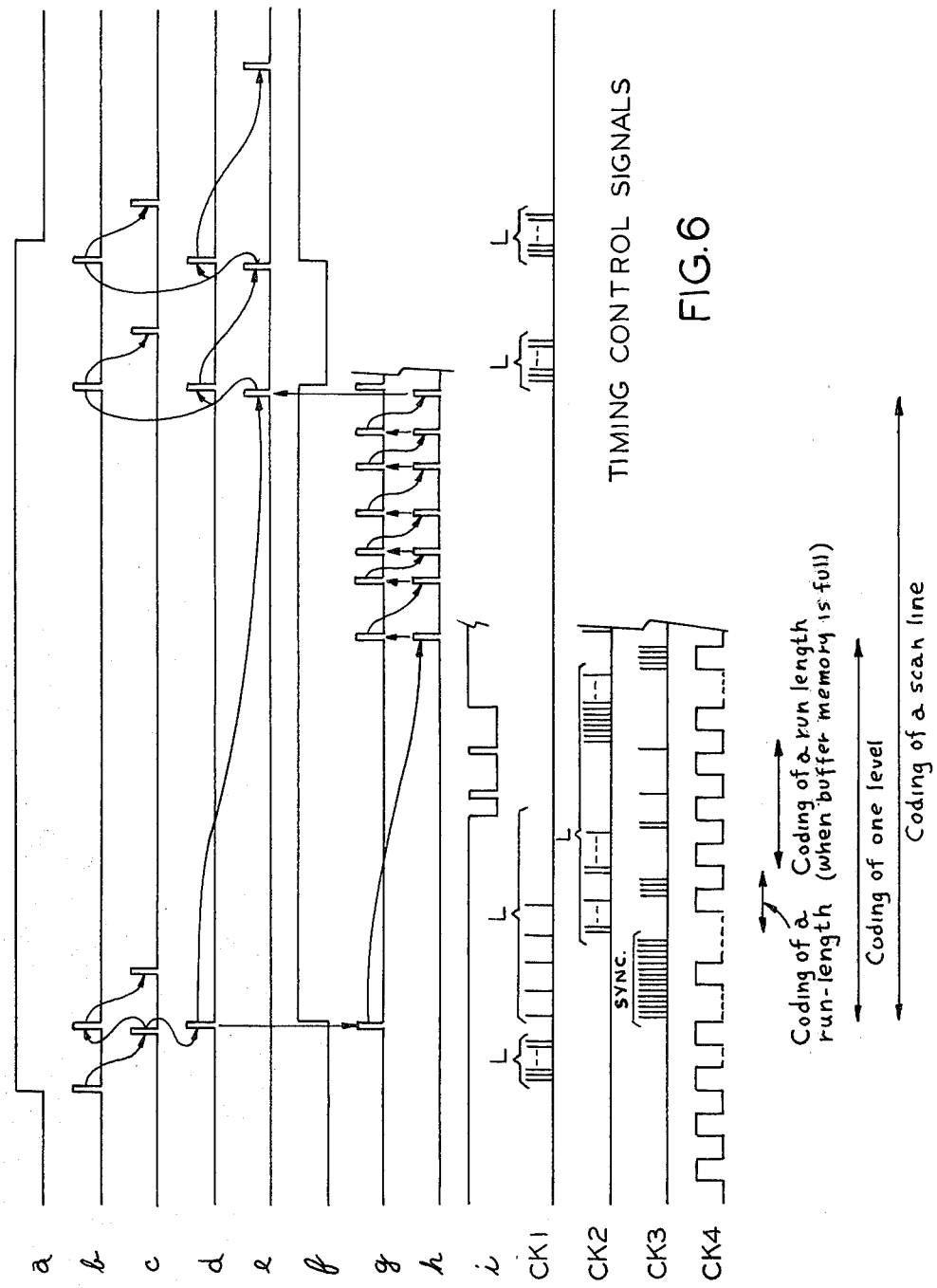

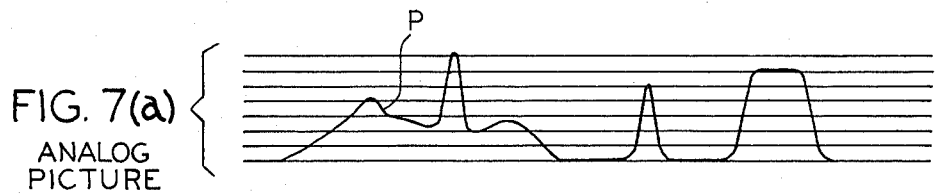
FIG. 7(a) ANALOG PICTURE SIGNAL
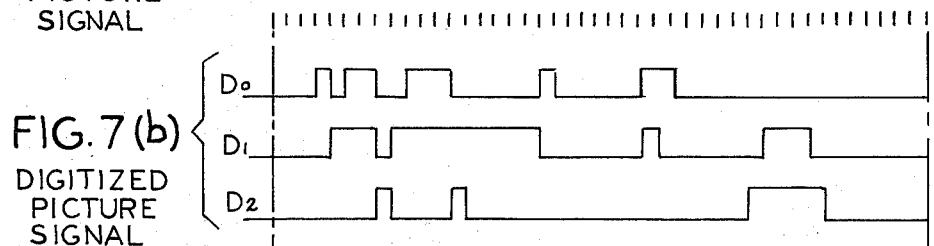
FIG. 7(b) DIGITIZED PICTURE SIGNAL
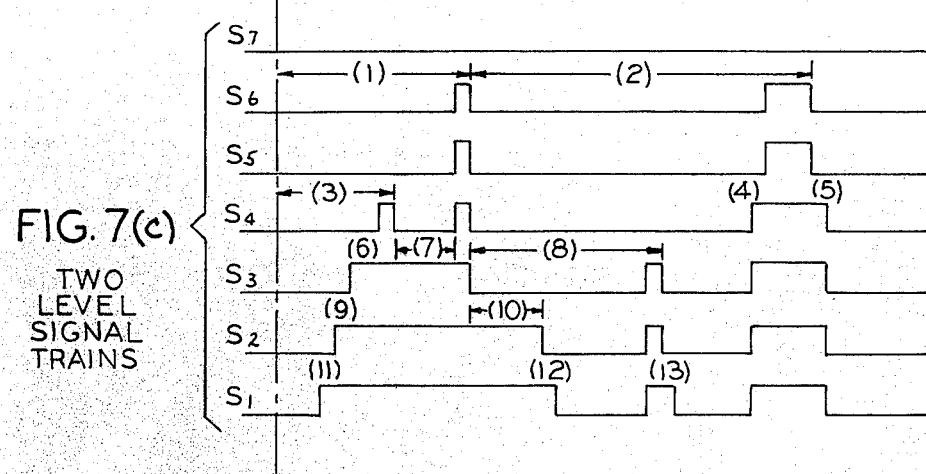
FIG. 7(c) TWO LEVEL SIGNAL TRAINS
FIG. 7(d)
$$\underline{SOL(7)\ SOL(6)\ 01\ F(12)\ F(1)}_{(1)}\ \underline{01\ F(20)\ F(3)\ SOL(5)\ 10101010}_{(2)}$$
$$\underline{SOL(4)\ 01\ F(7)\ F(1)\ 1010}_{(3)}\ \underline{11\ F(1)}_{(4)}\ \underline{11\ F(1)\ SOL(3)}_{(5)}\ \underline{11\ F(2)}_{(6)}\ \underline{0010}_{(7)}$$
$$\underline{01\ F(12)\ F(1)\ 1010\ SOL(2)}_{(8)}\ \underline{11\ F(1)}_{(9)}\ \underline{11\ F(5)\ 10101010\ SOL(1)}_{(10)}$$
$$\underline{11\ F(1)}_{(11)}\ \underline{11\ F(1)}_{(12)}\ \underline{1011\ F(1)\ 1010}_{(13)}$$

MULTI-LEVEL COMPARATOR 23

TIMING CONTROL SIGNALS

TIMING SIGNALS APPEARING IN CIRCUIT OF FIG.12a

TIMING CONTROL SIGNALS APPEARING IN CIRCUIT OF FIG. 11

DIGITAL FACSIMILE SYSTEM TO BAND-COMPRESS HALF-TONE PICTURE SIGNALS

This invention relates to digital facsimile systems, and more particularly to digital facsimile systems to band-compress half-tone picture signals.

The term "pel" means "picture element" and refers to a digital signal which may be transmitted in order to reproduce a single elementary area of a picture which is transmitted by a facsimile system.

Along with the development of digital data processing techniques, over the recent years, digital techniques have come to be extensively used in facsimile systems. There are now many digital facsimile systems which are able to achieve transmission which is faster than the transmission of conventional analog facsimile systems. This is done by slicing (at a certain slice level) analog picture signals obtained by scanning the picture to be transmitted, thereby converting them into two-level picture signals and further subjecting the converted signals to digital band compression, such as run-length encoding. A digital facsimile system of this kind, transmits pictures in the form of digital information. Therefore it is able to store information in ordinary digital memory elements. There are many advantages including ready applicability to a store and forward switching network and facilitation of picture conversion by a computer or the like, which makes it useful for various purposes. Such facsimile systems are, therefore, expected to find increasing use from now on.

On the other hand, however, the two-level conversion of picture signals by the digital system makes it unsuitable for transmission of photographs and other graphical documents involving half-tone signals. Even black and white items, such as printed documents, will be reproduced in less readable facsimiles if there are stains on the paper or if they are written on colored paper, because the stains or background color may turn out black on the reproduced copies.

These circumstances make it necessary, even for digital facsimile systems, to be able to reproduce half tones where required.

Picture signals may be simply digitalized and directly subjected to digital transmission to reproduce a half-tone picture. Transmission of, for instance, pictures of JIS A4 size, digitalized in eight shade values (three bits), at a sampling rate of 6×6 picture elements (pels)/mm² will, involve a total data quantity of 210 (mm)×297 (mm) ×(6×6) (pels/mm)×3 (bits/pel=6.7 (megabits) per page. This much data will take about 23 minutes to transmit, even at a speed of 4,800 bps, which is about four times as long as it takes to transmit a conventional analog facsimile of a similar picture. Therefore, in the transmission of half tones by a digital facsimile system some form of data compression is indispensable. It is further desirable, from the viewpoint of reducing hardware, that data compression for this purpose be accomplished with a system having many common elements with the band compression system used for transmission of black and white two-level picture signals.

It is, therefore, an object of the present invention to provide a band-compression digital facsimile system capable of transmitting half tones and of satisfying the foregoing requirements.

In accordance with this invention, a digital facsimile system provides for band-compression of half-tone picture signals. Primarily, the system generates trains of two-level signals by slicing analog picture signals at multi-quantization levels. These analog picture signals result in segments which are obtained by optically scanning a picture which is to be transmitted. The optical scanning is in the two directions described as main scanning and subscanning. Means are provided for band-compressing these trains of two-level signals.

The band compression achievable with the present invention is based on the encoding and transmission of only the differences between corresponding bits of the two-level signals, the differences being detected through a comparison performed either between individual bits belonging to one two-level signal or between corresponding bits belonging to separate two-level signal.

Other features of the present invention will be apparent from the following description taken in conjunction with the accompanying drawings, in which:

FIG. 4c shows the waveforms of signals in various parts of FIG. 4a;

FIG. 6 shows the waveforms of signals for explaining timing pulses for use in the embodiment of this invention;

FIG. 7a shows the waveform of an analog picture signal;

FIG. 7b is a time chart of parallel binary-coded picture signals obtained by digitalizing the analog picture signal;

FIG. 7c shows the waveforms of a plurality of two-level signal trains obtained, when the quantization level of the analog signal is varied in seven stages, for the varied quantization levels;

FIG. 7d is a typical string of codes constituting a signal supplied to a transmission path;

FIG. 12b shows the waveforms of signals in various parts of FIG. 12a, and

Figure 1:
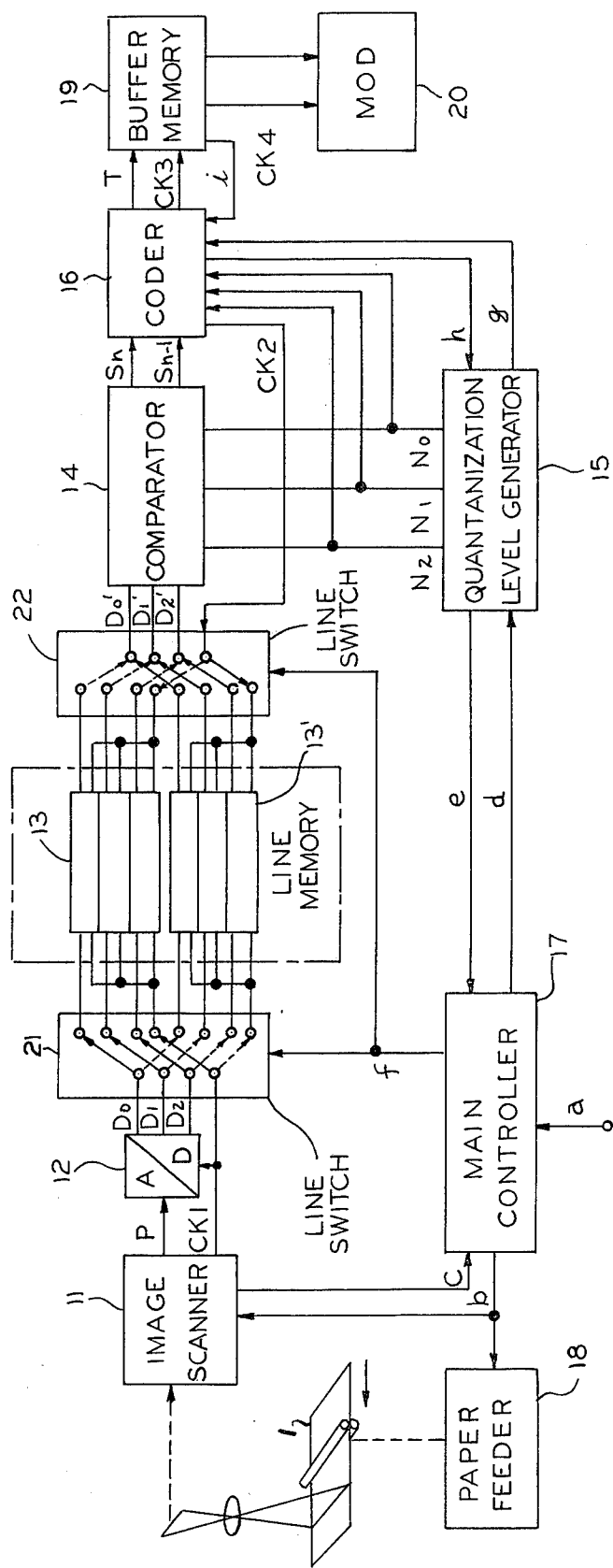
FIG. 1 is a block diagram illustrating an embodiment of the facsimile transmitter system according to this invention.

In FIG. 1, a main controller 17 generates a start signal b in response to a transmit demand signal a. The start signal is a scanning instruction for scanning one line by an image scanner 11 which primarily comprises a photo-electric converter unit, having a plurality of sensor elements and a shift register unit. The sensor elements are arranged in one dimensional direction. The shift register unit successively turns out electric potentials stored in the sensor elements. At the same time, the start signal b instructs a paper feed device to give the space between scanning lines, in the direction normal to the scanning direction.

An analog picture signal P for one scanning line is obtained by photoelectric conversion by the image scanner 11 and is illustrated in FIG. 7a. This analog signal is applied to an AD (analog-to-digital) converter 12. Under the control of a clock pulse CK1, the analog signal is converted into a parallel digital picture signal $D_2D_1D_0$ of eight levels or three bits per pel, as illustrated in FIG. 7b (In this embodiment no analog picture signals of more than eight levels are supposed to exist).

This digital picture signal is first applied through a line switch 21 to a line memory 13, which is one of two paired line memories. Each line memory has three first-in-first-out (FIFO) memories corresponding to the three bits of each pel, and has a storage capacity sufficient for one scanning line equivalent to picture signals of L pels. The output of the other line memory 13' is connected via another line switch 22 to a comparator 14. Accordingly the picture signal $D_2D_1D_0$ is written into the line memory 13 in response to the clock pulse CK1, but a read-out clock CK2 has not yet been generated at the clock terminal of a coder 16. Therefore, there is no read-out from the line memory 13'.

When a scanning of one scanning line has been completed, the image scanner 11 generates a scanning completion signal c. In response thereto, the main controller 17 generates a coding start signal d. At the same time, it gives a switch signal f to the line switches 21 and 22 in order to reverse them, and further generates another start pulse b to instruct a paper feed to advance the paper by one scanning line and to scan the next scanning line. In this scanning period, therefore, picture signals of the second scanning line are written into the line memory 13'. Meanwhile, to the line memory 13 is applied to the read-out clock pulse CK2, so that the earlier-stored picture signals of the first scanning line are read out and entered into the comparator 14.

A quantization level generator 15, as will be explained in detail below, is preset to turn out a 3-bit binary signal of "7" in quantization level in response to the coding demand signal d, and to send to the coder 16 a one-level coding demand signal g corresponding to that quantization level. In response to a completion signal h sent upon completion of the first one-level coding, the generator 15 reduces its quantization level to "6", and generates the next one-level coding demand signal g. In a similar procedure, the quantization level is repeatedly reduced one count at a time and the one-level coding demand signal g is generated until the quantization level reaches "1".

The comparator 14 sequentially compares one scanning line equivalent of pels with quantization levels (n−1; where N=2, 3, ..., 8) from the quantization level generator 15. The scanning equivalent is read out of the line memory 13 in response to the clock CK2. With respect to each pel of the picture to be transmitted, comparator 14 generates a pair of signals comprising (1) a two-level signal $S_n$ which is 1 when the quantization level is equal to or greater than n or otherwise 0 and (2) another two-level signal $S_{n-1}$ which is 1 when the quantization level is equal to or greater than (n−1) or otherwise 0. Therefore, every time the quantization level is shifted, one scanning line equivalent of pels are read out of the line memory 13 and the comparator 14 supplies a pair of two-level signals $S_n$ and $S_{n-1}$ for each pel. In this embodiment, where the maximum quantization level is "7", readout from the line memory takes place seven times, and signal pair ($S_8$, $S_7$), ($S_7$, $S_6$), ($S_6$, $S_5$), ... ($S_2$, $S_1$) are correspondingly generated.

Since no levels above 8 are contained in picture signals, as supposed above, $S_8$ is always 0. The signals $S_7$, $S_6$, ... $S_1$ are such two-level signal trains, as shown in FIG. 7c. The seven pairs of signals per scanning line of signal trains ($S_n$, $S_{n-1}$), supplied from the comparator 14, are coded as described later on.

Upon completion of coding, the quantization level generator generates a completion signal e for one scanning line coding. Upon receiving the coding completion signal e, the main controller 17 generates the next scanning start signal b, switch signal f and coding demand signal d. These control signals process the picture signals in the manner described above while writing the picture signals of the third scanning line into the line memory 13 and reading the picture signals of the second scanning line out of the line memory 13'.

Figure 4B:
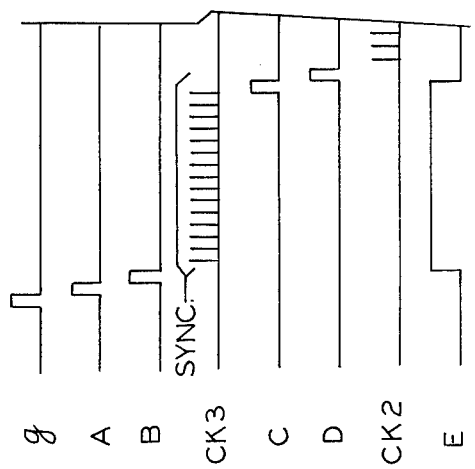
FIG. 4b shows the waveforms of control signals for explaining the insertion of a synchronization signal in the coder.
Figure 4A:
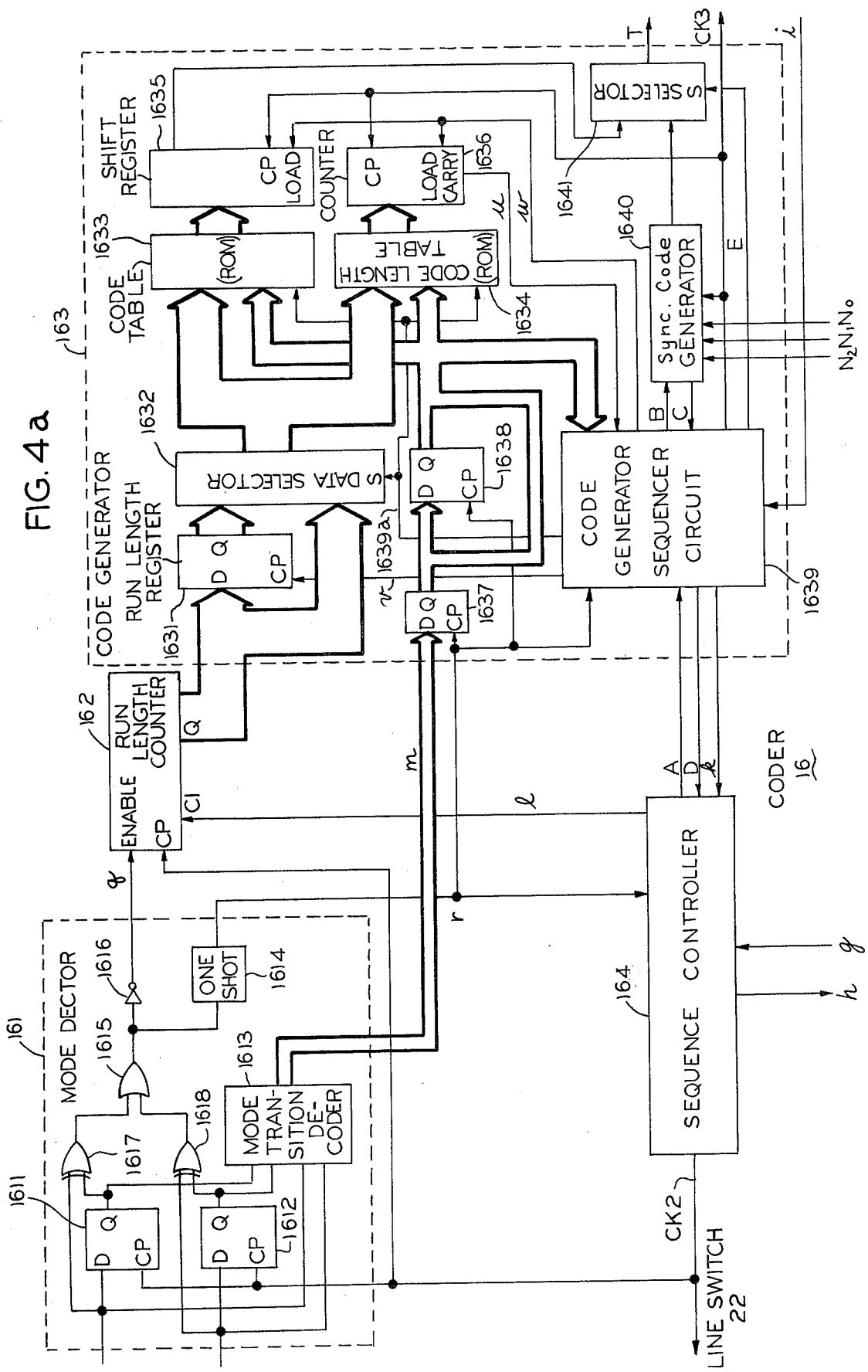
FIG. 4a is a block diagram illustrating a coder for use in the embodiment of this invention.

FIGS. 4a and 4b combined show the coder 16 which includes as its components a mode detector 161, a run length counter 162, a code generator 163 and a sequence controller 164. The sequence controller 164, upon receipt of a one-level coding demand signal g, sends a synchronization code sending demand signal A to the code generator 163. When a code generator sequencer circuit 1639 (which constitutes a part of the code generator 163) supplies a set signal B, a 15-bit sync. code pattern is set in a sync. code generator 1640 according to a designation code $N_2N_1N_0$ received from the quantization level generator 15. At the same time, a selector signal E, from the code generator sequencer circuit 1639, is applied at a high level to a selector 1641, which connects the output of the sync. code generator 1640 to a buffer memory.

In this state, a clock pulse CK3 is sent out from the code generator sequencer circuit 1639. The sync. code generator 1640 supplies the sync. code bit by bit in synchronization with CK3. Upon completion of the transmission of the sync. code, code generator 1640 feeds a completion signal C to the code generator sequencer circuit 1639. The code generator sequencer circuit 1639 sets the select signal of the selector 1641 at a low level, connects the output of a shift register 1635 for run length code supply to the buffer memory, and sends out a coding completion signal D to the sequence controller 164. In response to a signal D, controller 164 feeds a clear signal 1 to the run length counter 162. At the same time, controller 164 starts sending out the clock CK2. The clock CK2 is fed not only to the line memory 13 but also to the mode detector 161 and the run length counter 162. The mode detector 161 observes in which of the three modes is then active, i.e., ($S_n$=1, $S_{n-1}$=1), ($S_n$=0, $S_{n-1}$=1) and ($S_n$=0, $S_{n-1}$=0). There is no ($S_n$=1, $S_{n-1}$=0) combination because the quantization level is sequentially reduced. At the same time, mode detector 161 gives an enable signal q to the run length counter 162 in order to count the number of pels belonging to the same mode (hereinafter called "run length").

Upon an occurrence of a mode transition, the mode detector 161 turns off the enable signal a to the counter 162, gives to the code generator 163 a type m of the mode transition which has occurred, and at the same time generates a coding execution demand signal r. Since in such a mode transition, the sequence controller 164 ceases to generate the clock CK2, the read-out from the line memory is temporarily suspended.

Coding is achieved in conformity with the following rules:

(1) For a transition from $(S_n=0, S_{n-1}=0)$ to $(S_n=0, S_{n-1}=1)$, the output of the run length counter 162 (i.e. the run length of $(S_n=0, S_{n-1}=0)$) is memorized, but no coding is achieved at this point of time.

(2) For a transition from $(S_n=0, S_{n-1}=0)$ to $(S_n=1, S_{n-1}=1)$, a code "10" is given.

(3) For a transition from $(S_n=0, S_{n-1}=1)$ to $(S_n=0, S_{n-1}=0)$, coding is achieved by either one of the following two procedures:

(3-1) If the immediately proceding mode transition took place from $(S_n=0, S_{n-1}=0)$ to $(S_n=0, S_{n-1}=1)$, the run length of $(S_n=0, S_{n-1}=0)$ memorized according to (1) is coded and sent out after a code "01", and the current output of the run length counter 162 (i.e. the run length of $(S_n=0, S_{n-1}=1)$) is further coded and sent out.

(3-2) If the immediately preceding mode transition did not take place from $(S_n=0, S_{n-1}=0)$ to $(S_n=0, S_{n-1}=1)$, the output of the run length counter 162 (i.e. the run length of $(S_n=0, S_{n-1}=1)$) is coded and sent out after a code "11".

(4) For a transition from $(S_n=0, S_{n-1}=1)$ to $(S_n=1, S_{n-1}=1)$, coding is achieved by either one of the following two procedures:

(4-1) If the immediately preceding mode transition took place from $(S_n=0, S_{n-1}=0)$ to $(S_n=0, S_{n-1}=1)$, the output of the run length counter 162 (i.e. the run length of $(S_n=0, S_{n-1}=1)$) is coded and sent out after a code "11".

(4-2) If the immediately preceding mode transition did not take place from $(S_n=0, S_{n-1}=0)$ to $(S_n=0, S_{n-1}=1)$, a code "00" is sent out.

(5) For a transition from $(S_n=1, S_{n-1}=1)$ to $(S_n=0, S_{n-1}=0)$, a code "10" is sent out.

(6) For a transition from $(S_n=1, S_{n-1}=1)$ to $(S_n=0, S_{n-1}=1)$, no coding is achieved.

Every time one bit of coding data T is generated in response to a mode transition in conformity with the above-stated coding rules, the code generator 163 generates a write-in clock pulse CK3 to cause a write-in of coding data into a buffer memory 19 (FIG. 1).

Every time a coding procedure corresponding to a mode transition is completed in conformity with the coding rules, the code generator 163 sends a mode transition coding completion signal k to the sequence controller 164. Controller 164 generates and sends a clear signal 1 to the run length counter 162 and a clock signal CK2 to start a monitoring of the mode transition to the following mode combination $(S_n, S_{n-1})$. Responsive thereto, there is a counting of the run length and coding. Upon completion of read-out and coding of L pels for one scanning line, the sequence controller 164 generates a one-level coding completion signal h. An insertion of sync. signals and coding are similarly executed for the quantization level of the next step.

The picture signal illustrated in FIG. 7a is coded as shown in FIG. 7d, in which reference numbers are given corresponding to pertinent signals in FIG. 7c with a view to facilitating understanding of the principle of coding. Among these codes, SOL(n) is a sync. code indicating the start of information concerning $S_n$ and F(n), a run length code indicating a run length n, so that well known run length codes can be used.

Figure 4C:
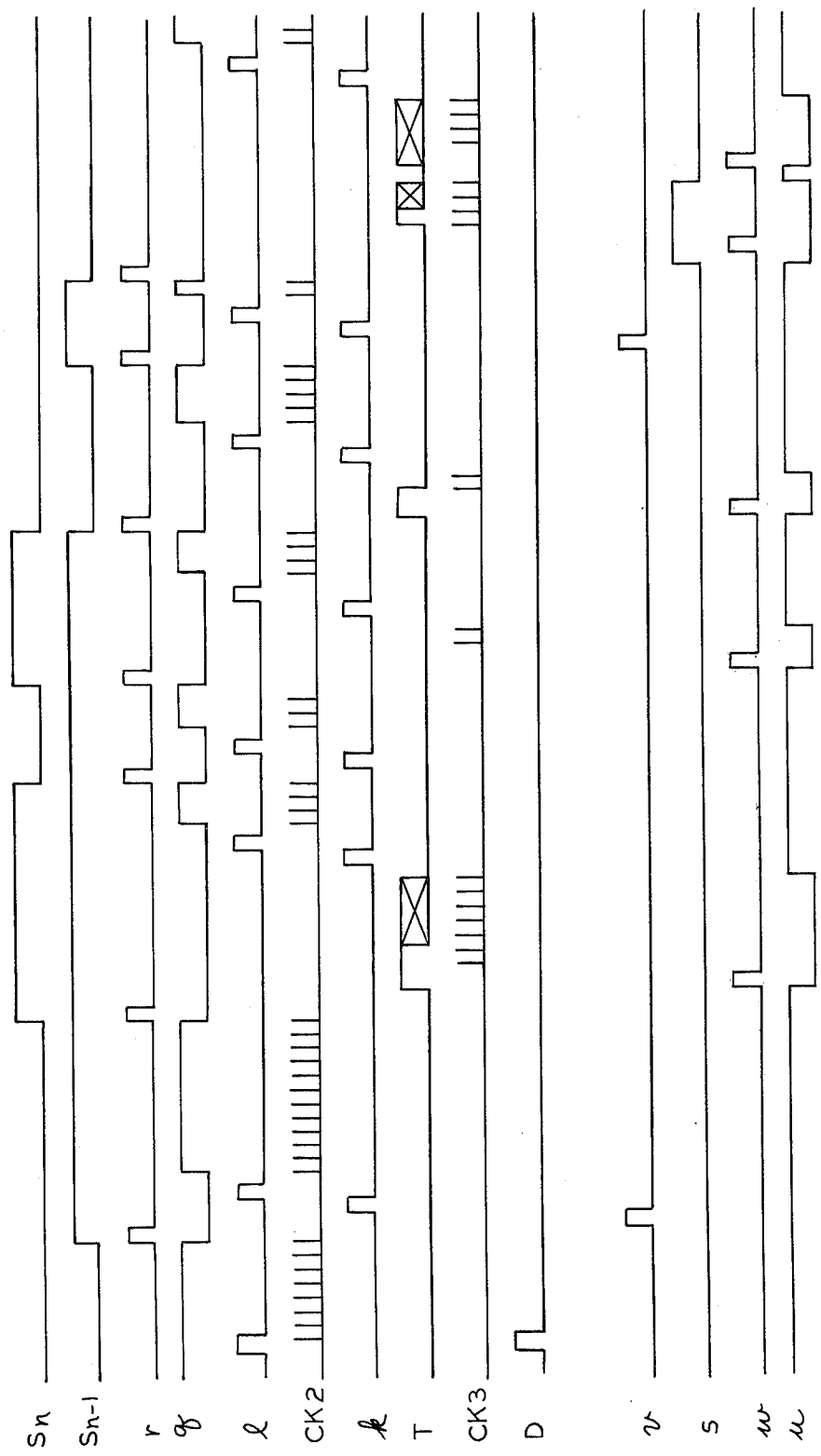

To describe the coder 16 in further detail with reference to FIG. 4c, the mode detector 161 includes as its components two flip-flops 1611 and 1612, a mode transition decoder 1613, a one-shot circuit 1614 and other logical operation circuits. One of the two flip-flops memorizes $S_n$, and the other $S_{n-1}$, of the preceding pel immediately. When either signal $S_n$ and $S_{n-1}$ or both change, there is a mode change, and the mode transition decoder 1613 gives the type m mode transition to the code generator 163. At the same time, the output of an exclusive OR gate is turned ON, the signal passes an OR gate 1618 1615, is inverted at an inverter 1616 and stops the run length counter 162 by turning OFF the enable signal q. At the same time, the signal r generated by the one-shot circuit 1614 is applied to the code generator 163 and the sequence controller 164 to demand an execution of coding and to temporarily suspend the clock CK2, respectively.

The code generator 163 primarily comprises a run length register 1631, a data selector 1632, a code table read-only memory (ROM) 1633, a code length table ROM 1634, a code sending-out shift register 1635, a code length counter 1636, transition mode registers 1637 and 1638, and a code generator sequencer circuit 1639. Upon demand for coding execution, from the mode detector 161, a signal group m (indicating the type of the current mode transition) is latched to the transition mode register 1637. At the same time, the signal group m of the immediately preceding mode transition is latched to the other transition mode register 1638. To the code table ROM 1633 and the code length table ROM 1634 is supplied the run length through the data selector 1632. The types of the immediately preceding and current mode transitions are also supplied from the transition mode registers 1638 and 1637, respectively, to the code table ROM 1633 and the code length table ROM 1634. The code generator sequencer circuit 1639 further supplies the ROMs 1632,1634 with a one-bit signal. This one-bit signal is sent over wire 1639a which is connected in common with the select terminal of the data selector 1632 and the ROM's 1633,1634. Data are written into the ROMs so that codes corresponding to these inputs can be supplied from the code table ROM 1633 and respective complements to the lengths of the codes can be supplied from the code length table ROM 1634.

The code generator sequencer circuit 1639 is also connected to receive the output of the one-shot circuit 1614. Circuit 1639 checks the signal indicating the type of mode transition upon receipt of a pulse r demanding execution of coding. Circuit 1639 acts in the following manner to execute coding in accordance with the coding rules: If the mode transition is to be governed by Rule (1), a latch pulse v is sent to the run length register 1631 to have the run length memorized, and immediately sends a coding completion pulse k to the sequence controller 164; for a mode transmission under Rule (2), a load pulse w is sent to the code sending-out shift register 1635 and the code length counter 1636 to latch the output from the code table ROM 1633, and then data are sent out; for a mode transition under Rule (3-1), the selector signal s to the data selector 1632 is made "1" and, after a load pulse w is supplied to the shift register 1635 and the code length counter 1636 to latch the output from the code table ROM 1633, data are sent out; further, under Rule (3-1), the selector signal s to the data selector 1632 is made "0" and, after a load pulse w is supplied to the shift register 1635 and the code length counter 1636 to latch the output from the code table ROM 1633, data are sent out; for a mode transition under Rule (3-1), (4-1), (4-2) or (5), the same action as under Rule (2) takes place; and for a mode transition under Rule (6), only a coding completion pulse is sent out.

After giving a load pulse w to the shift register 1635 and the code length counter 1636 to set the code and the code length, respectively, the code generator sequencer circuit 1639 generates the clock pulse CK3 and sends out digital picture signal data obtained by band compression. This data is sent in synchronization with clock pulse CK3 until a carry signal u is generated from the code length counter 1636. When a write-enable signal i, returned from the buffer memory 19 (FIG. 1), is switched OFF, the code generator sequencer circuit 1639 temporarily suspends the supply of clock pulses CK3 until the write-enable signal i again turns ON, so that the buffer memory 19 is protected from being filled to overflowing. When the carry signal u is generated from the code length counter 1636, the circuit 1639 stops sending clock pulses CK3 and gives a mode transition coding completion signal k to the sequence controller 164.

The buffer memory 19 (FIG. 1), which is a FIFO memory, writes in the coding data T in response to the write-in clock CK3 and turns out stored data on a first-in first-out basis in response to a read-out clock pulse CK4. When the buffer memory 19 is not filled with data, the write-enable signal i is switched ON and data are successively written in from the coder, but when the signal i is turned OFF, coding is temporarily suspended.

A modulator 20 (FIG. 1), according to the bit rate of data supply to the line, reads out coded data from the buffer memory 19 (FIG. 1) in response to the read-out clock pulse CK4, and sends out the data to the line.

Figure 2:
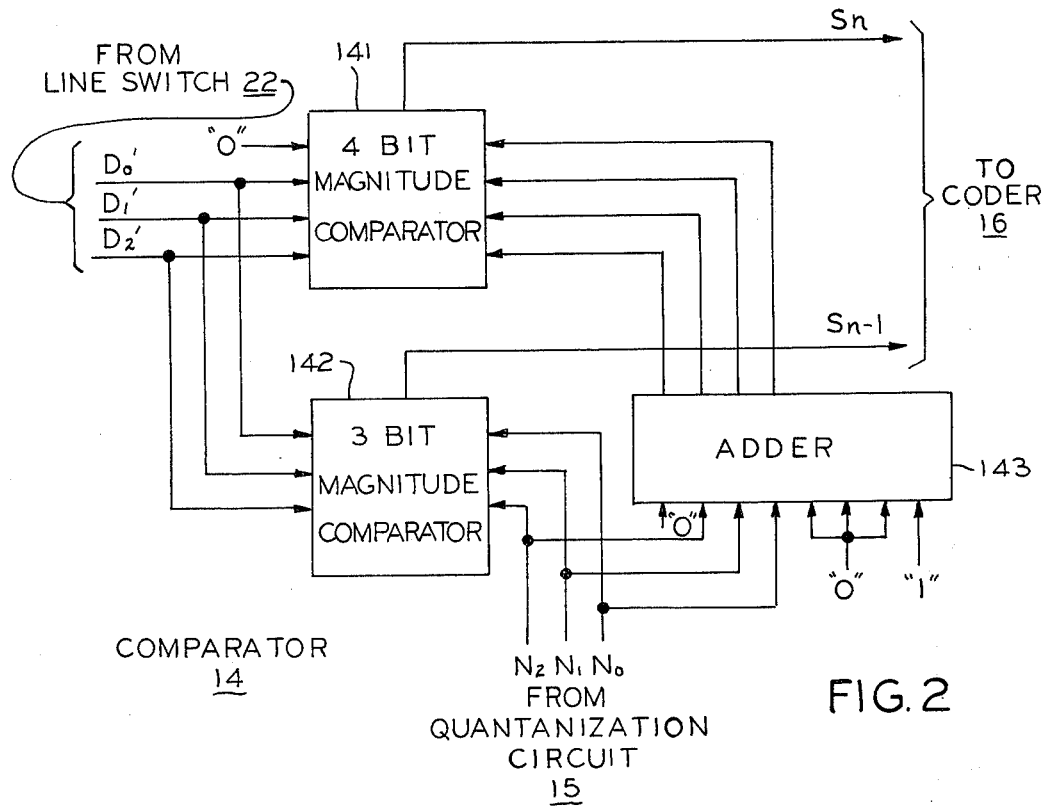
FIG. 2 is a block diagram illustrating a comparator for use in the embodiment of this invention.

FIG. 2 shows the comparator 14 which includes as its components a four-bit magnitude comparator 141, a three-bit magnitude comparator 142 and an adder 143. A binary numeral (n−1) represented by a binary code $N_2N_1N_0$ is increased by the adder 143 by one count to become another binary numeral n expressed in four bits. This four-bit number is compared with a three-bit picture signal $D_2D_1D_0$ representing one pel, by the four-bit magnitude comparator 141. Meanwhile, the three-bit magnitude comparator 142 compares a picture signal with a quantization level (n−1). Thus, from the comparator 141 comes out a two-level signal $S_n$ which has been compared with a quantization level n. From the comparator 142, there is another two-level signal $S_{n-1}$ which has been compared with another quantization level (n−1).

Figure 3:
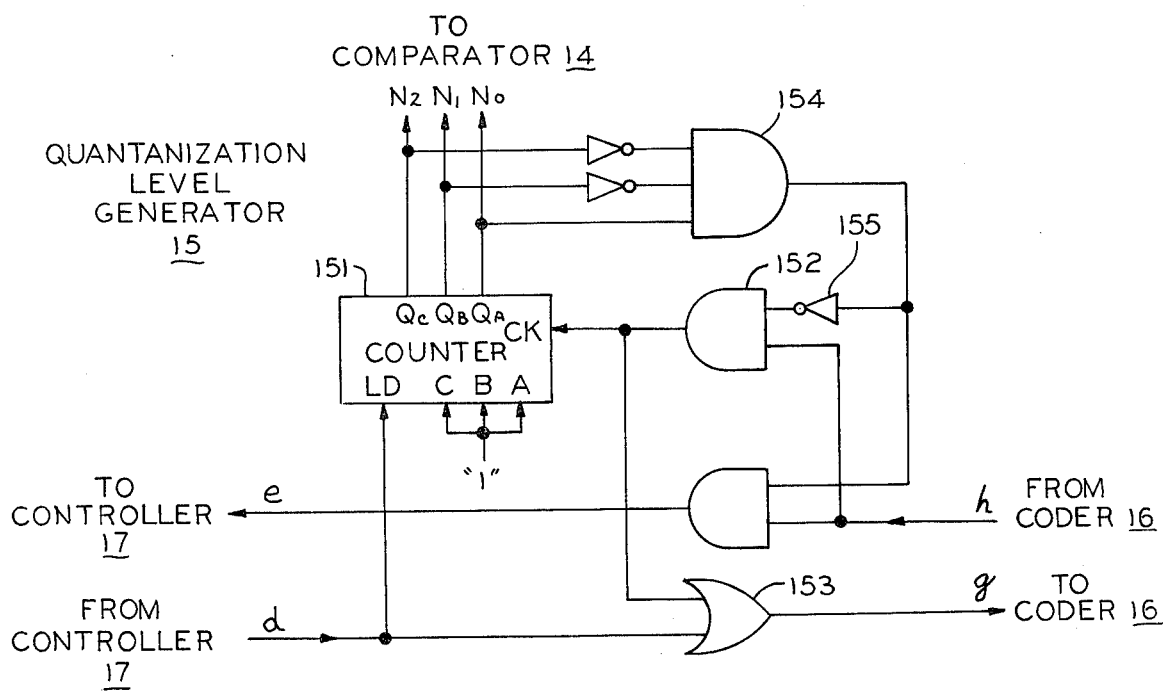
FIG. 3 is a block diagram illustrating a quantization level generator for use in the embodiment of this invention.

The quantization level generator 15, as illustrated in FIG. 3, mainly consists of a counter 151, AND gates 152 and 154, an OR gate 153 and an inverter 155. Upon receiving a one-scanning line coding demand signal d, the down counter 151 is preset to "7", and at the same time, the quantization level generator 15 generates a one-level coding signal g. When a one-level coding completion signal h is received from the coder 16 (FIG. 4a), the AND gate 152 is turned ON, and one pulse is applied to the CK teminal of the counter, in order to reduce the quantization level to "6". At the same time, a one-level coding signal g is generated through the OR gate 153. Similarly thereafter, every time one-level coding is completed, the quantization level is reduced by one count until it reaches "1". When one-level coding has been completed seven times, as is evident from the logical operation circuit illustrated in the drawing, the AND gate 152 is OFF because the other AND gate 154 is ON, with the result that is no longer a one-level coding signal g which is generated, but one-scanning line coding completion signal e is generated. Thus, the quantization level generator 15 (FIG. 1), for each one-scanning line coding start signal d fed to it, generates the one-level coding signal g seven times. Each time that signal g is generated, the quantization level is reduced one count (i.e., 7, 6, . . . or 1, and in that order). The one-scanning line coding completion signal e appears upon completion of the seventh one-level coding. The timing correlations between the signals d, e, g and h are illustrated in FIG. 6, as d, e, g and h.

Figure 5:
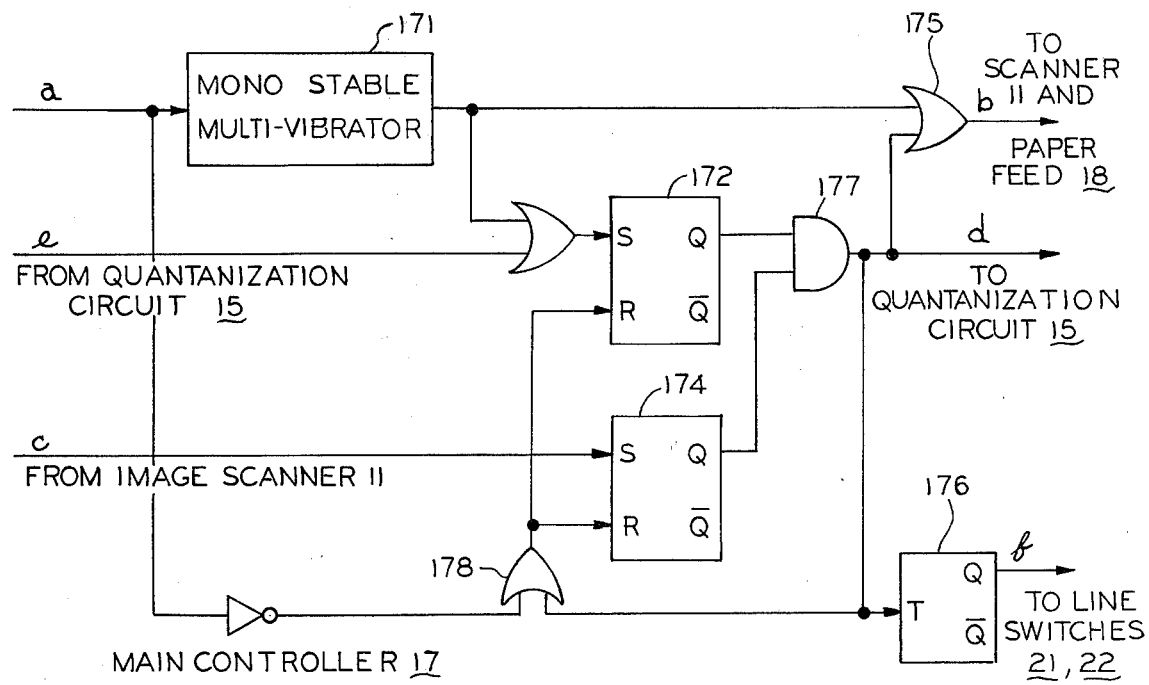
FIG. 5 is a block diagram illustrating a main controller for use in the embodiment of this invention.

The main controller (FIG. 1), is illustrated in FIG. 5, and primarily comprises a monostable multivibrator 171, an AND gate 177, OR gates 175 and 178, an inverter, R-S flip-flops 172 and 174, and a toggle flipflop 176. The pulse which is generated by the monostable multivibrator 171 (when the transmit demand signal a is turned ON) passes the OR gate 175 to generate a start pulse b, and also turns ON the flipflop 172. Upon receipt of a scanning completion signal c for one scanning line from the image scanner 11 (FIG. 1), the flipflop 174 is turned ON, a coding demand signal d is generated from the AND gate 177. At the same time the scanning start pulse b is generated for the next scanning line and the switch signal f from the toggle flipflop 176 are inverted. The flipflops 172 and 174 are reset through the OR gate 178. Similarly, thereafter, each time the scanning completion signal c and the coding completion signal e are received, the flipflops 172, 174 and 176 repeatedly generate the signals b, d and f, as illustrated in FIG. 6, until the transmit demand signal a is turned OFF.

As is obvious from the chart of the control signals given in FIG. 6, the periods of these signals are not uniform. The coding data are sent out from the modulator 20 (FIG. 1) to the line L1 at a constant clockrate (CK4). However, each time that the picture signal quantization level for a scanning line is shifted, the correlations between the resulting two-level signals vary according to the pel and the quantity of band-compressed coded data, which also varies. The result is that reading out of and writing into the line memories and optical scanning of the image scanner are executed according to the line scanning rate and the buffer memory capacity. Although the clock pulses CK1, CK2, CK3, CK4 and the write-enable signal i (similar to those which are generated after the first pulse of the one-line coding demand signal g is generated and before the second pulse is generated) are generated between the other pulses of the one-line coding demand signal, they are omitted in the chart (FIG. 6) for the sake of brevity and, further, because different units of time axis are used therein.

Figure 8:
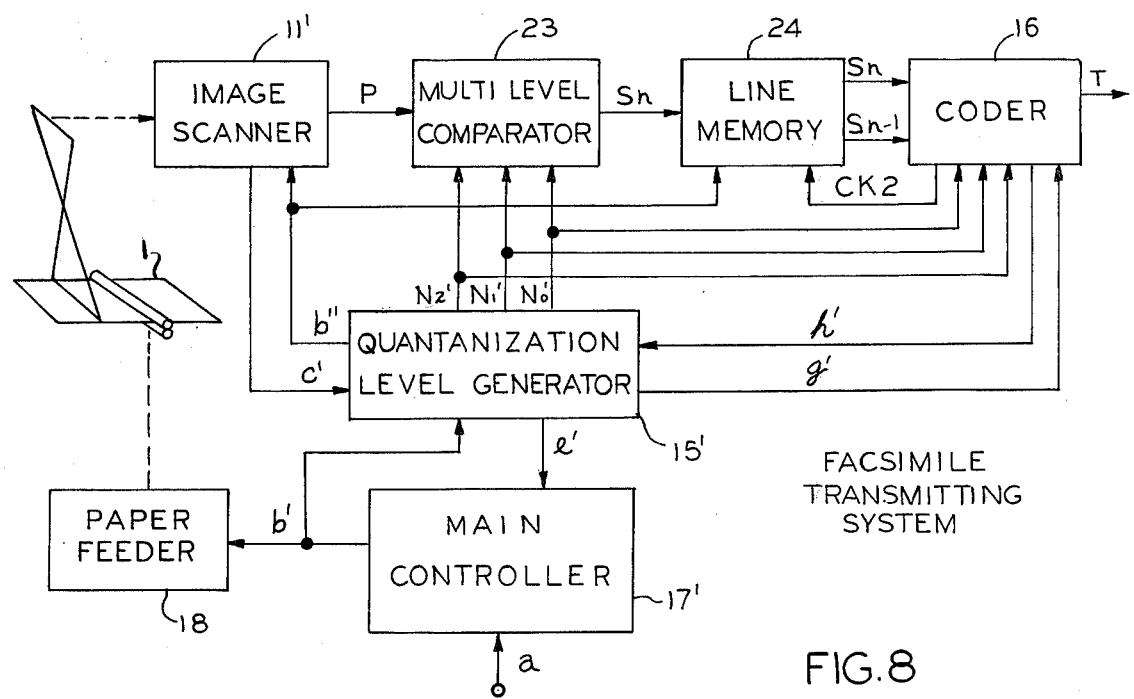
FIG. 8 is a block diagram illustrating another embodiment of this invention.

In FIG. 8, a second embodiment includes as its components a paper feeder 18, an image scanner 11′, a multi-level comparator 23, a line memory 24, a coder 16, a quantization level generator 15′ and a main controller 17′. This embodiment differs from the foregoing embodiment of FIG. 1 in the methods used to drive the image scanner and to generate the trains of two-level signals. In this embodiment (FIG. 8), the scanner either optically scans the same part of the picture to be transmitted each time that the quantization level is shifted or electrically scans the register section of the image scanner each time that the quantization level is shifted, thereby generating an analog picture signal as illustrated in FIG. 7a. On every such scanning time, a train of two-level signals is generated by slicing the analog picture signal at the shifted quantization level.

Only after a two-level signal train has been generated at a quantization level of "1" does the paper feeder advance the picture a space corresponding to next scanning line. Scanning at such a high rate can be realized by the use of a charge transfer device like a CCD or a BBD. These points will be explained in detail hereunder with reference to FIG. 10.

In response to a transmit demand signal a, the main controller 17' supplies a start signal b' to the paper feeder 18 and to the quantization level generator 15', which sets the quantization level at "7". At the same time, the image scanner 11' is supplied through the quantization level generators with a scanning start signal b'' for commanding one scanning line. An analog picture signal P, obtained from the image scanner 11', is compared in the multi-level comparator 23 with a quantization level "7". A resulting two-level signal train $S_7$ is written into the line memory 24. When a scanning line has been scanned to its end, in this manner, the quantization level generator 15' receives a scanning completion signal C' from the image scanner. Generator 15' sets the quantization level at "6" and, at the same time, instructs scanner 11' to start the second scanning of the same part of the picture to be transmitted. A two-level signal train $S_6$ is obtained by comparing the same picture signal with the previous one at the quantization level of "6". Signal $S_6$ is picked out of the multi-level comparator 23 and written into the line memory 24. Similarly thereafter, the image scanner 11' scans the same part of the picture (to be transmitted) seven times altogether, until a comparison is accomplished with quantization levels of 5, 4 . . . 1 in order to give two-value signal trains $S_5$, $S_4$ . . . $S_1$, respectively.

Only after the two-level signal trains $S_7$, $S_6$, $S_5$, $S_4$ . . . $S_1$ have been read out of the line memory 24 to complete a band-compression coding, a coding completion signal e' is supplied for the same scanning line from the quantization level generator 15' to the main controller. Only then is the start signal b' again generated. The picture to be transmitted is advanced by the equivalent of a space between two consecutive scanning lines. An instruction is then given to scan the second line of the picture. The scanning of the second line is again accomplished seven times, as described above.

Figure 9:
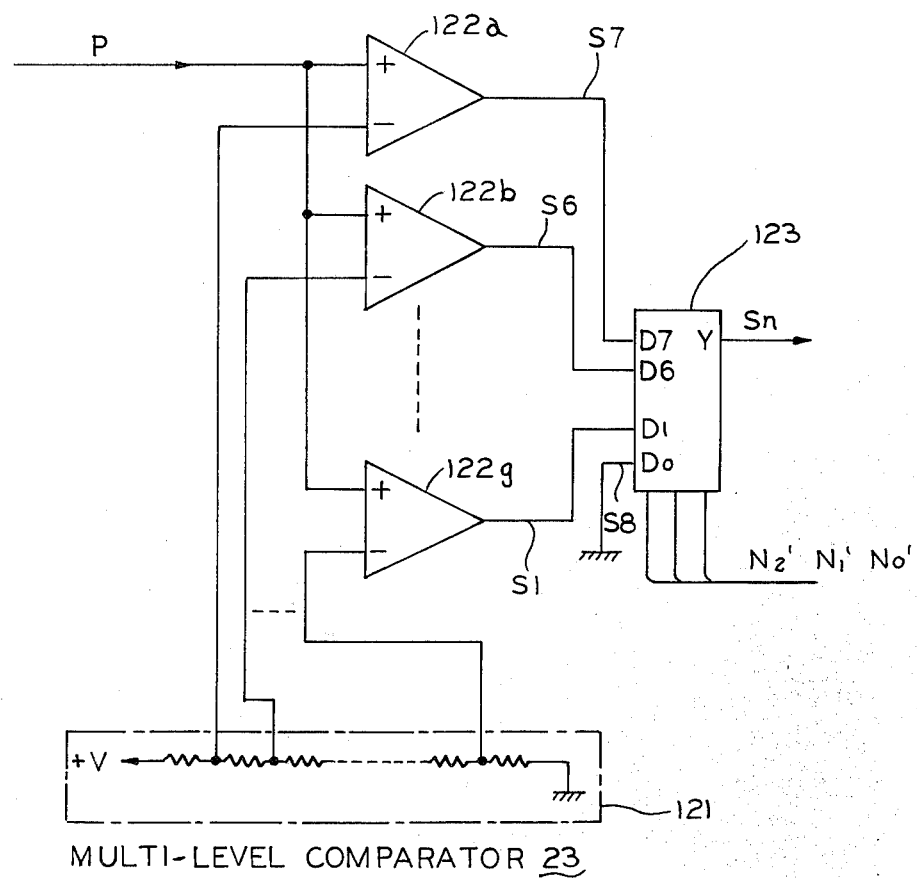
FIG. 9 is a block diagram illustrating a multi-level comparator for use in the embodiment shown in FIG. 8.

The multi-level comparator 23, as illustrated in FIG. 9, primarily consists of seven comparators 122a through 122g. A divider 121 achieves a division into seven terminals of equal resistances and a two-level picture signal train selector circuit 123. The non-inverted terminal of each of the comparators 122a through 122g is connected to the image scanner. The inverted terminal of each of these comparators is connected to an output terminal of the divider 121. When an analog picture signal P arrives, the comparators compare it with slice levels of 7, 6 . . . 1 supplied from the divider 121, and simultaneously generate two-level signals $S_7$, $S_6$ . . . $S_1$ in a signal train. The selector circuit 123 sequentially selects two-level signals $S_8$, $S_7$, $S_6$ . . . $S_1$ in a signal train, in accordance with a value n' indicated by a quantization level designating signal $N'_2N'_1N'_0$. Signal $S_8$, wholly consisting of zeros, serves as a reference signal for coding $S_7$, and is supplied by the selector circuit when a signal n'=0.

The line memory 24 (FIG. 8) is a type of memory composed by adding an address counter to a random access memory (RAM). The address counter is incremented at each read-out or write-in clock pulse, and has a storage capacity for at least three two-level signal trains. Upon receiving a one-level coding signal g', the coder 16 reads out of the line memory signals ($S_8$, $S_7$) and achieves a coding corresponding to ($S_8$, $S_7$). Meanwhile, signal $S_6$ is written into the line memory. Upon completion of one-level coding, the quantization level generator 15', in response to a one-level coding completion signal h', sends out a signal b'' to the image scanner 11' and the line memory 24. Again, a one-level coding signal g' is sent to the coder 16. Signal $S_5$ instead of $S_8$ is written into the line memory 24, which reads out the signal pair ($S_7$, $S_6$) and accomplishes the coding corresponding thereto. The coding procedure will not be described here because it is the same as it is for the first embodiment.

Figure 10:
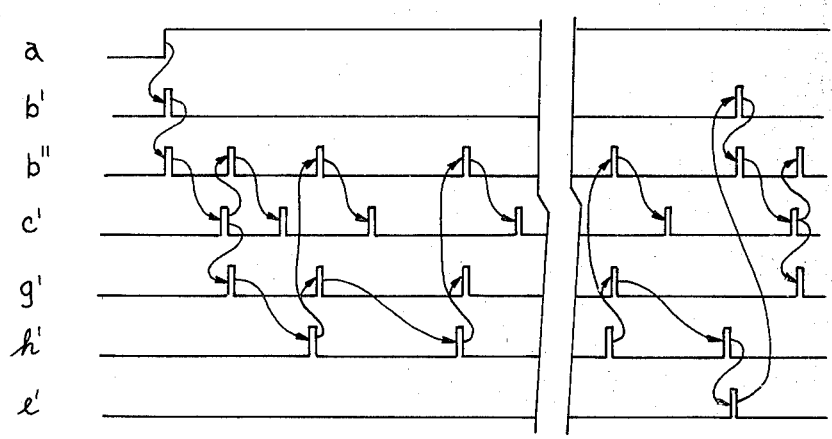
FIG. 10 shows the waveforms of control signals used in different parts of the embodiment illustrated in FIG. 8.

Since the quantization level generator 15' and the main controller 17' for use in this embodiment (FIG. 8) can be realized by modifying the corresponding ones used in the first embodiment (FIG. 1) and since their operations can be readily comprehended by referring to the time chart of FIG. 10, they are not described here, in detail.

The principle of this invention, as heretofore described, is to generate trains of two-level signals by slicing analog picture signals at a multi-level quantization level. The picture signals are obtained by optically scanning lines on the picture to be transmitted. This principle enables picture information to be efficiently transmitted with a reduced number of bits.

In the second embodiment of this invention, the image scanner repeatedly scans each line on the picture to be transmitted. Trains of two-level picture signals are generated by slicing at a quantization level every time that scanning is accomplished. This scanning requires coding storage of only two-level picture signals for one scanning line equivalent of pels and consequently only a small memory capacity. The difference in memory capacity is particularly significant where many shade values are involved.

In the above described embodiments, band compression is achieved by comparing trains of two-value picture signals with each other. However, it is obvious that band compression can as well be accomplished by applying to each train of two-level picture signals a one-dimensional information band compression formula by which black and white, two-value picture signals are run length-coded on each single scanning line.

Figure 11:
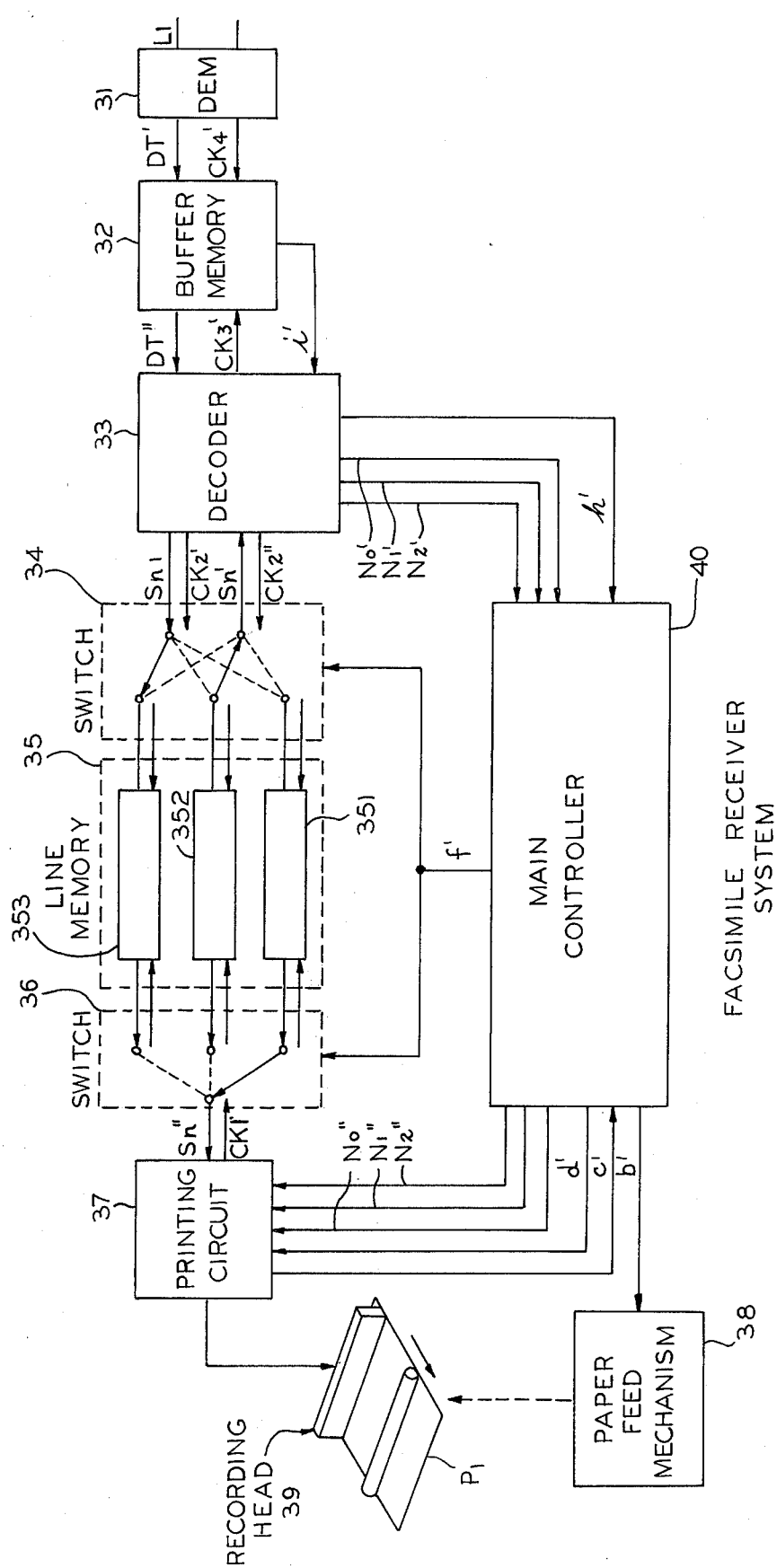
FIG. 11 is a block diagram illustrating a facsimile receiver system.

In FIG. 11, an input signal from the line L1 is demodulated by a demodulator 31, and digital data DT' are written into a buffer memory 32, bit by bit, in synchronization with a write-in clock CK'4. A decoder 32, if a read-enable signal i' from the buffer memory is ON, sends out a read-out clock CK'3 to read data DT'' out of the buffer memory.

Figure 12A:
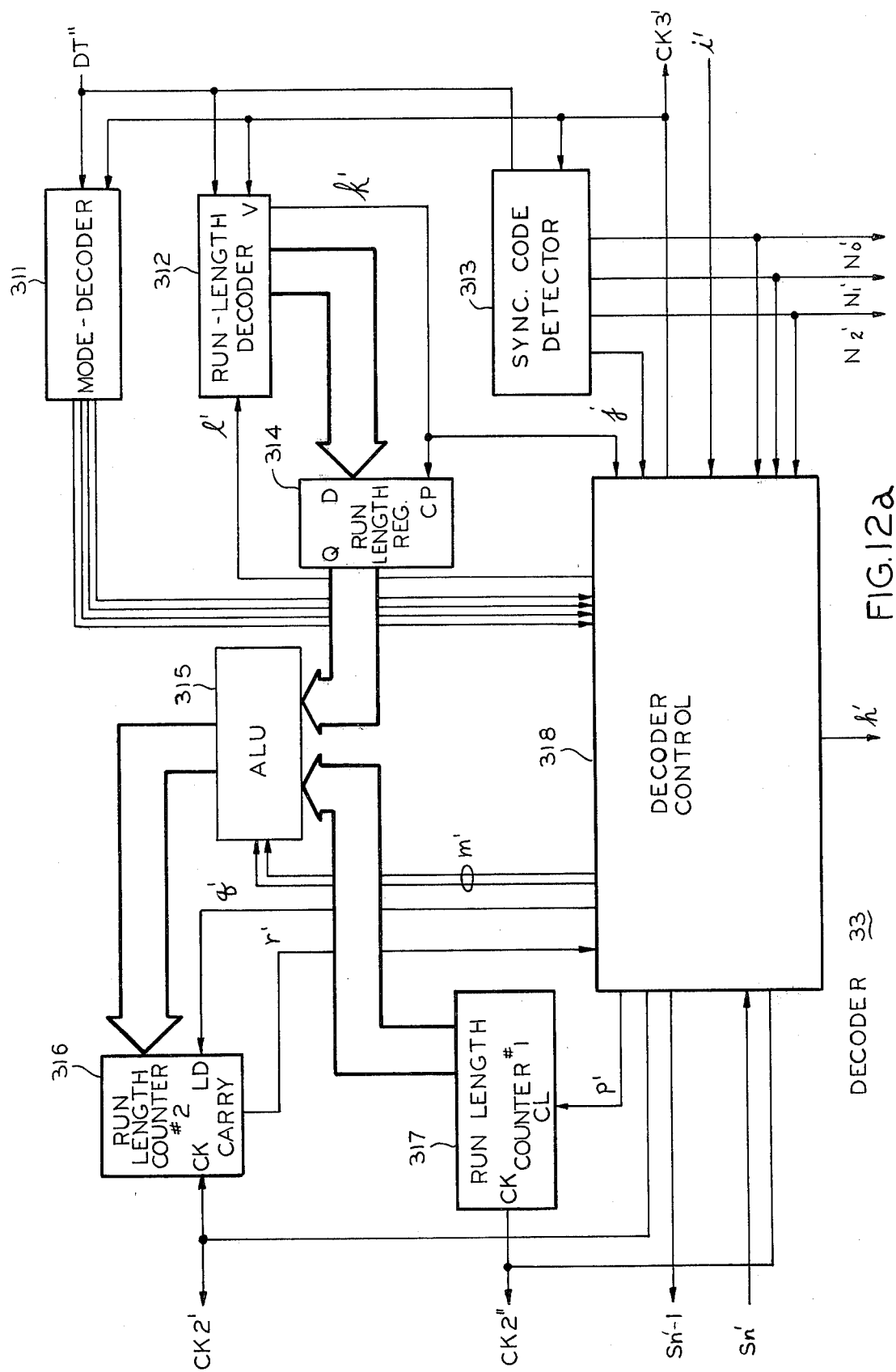
FIG. 12a is a block diagram illustrating a decoder.
Figure 12B:
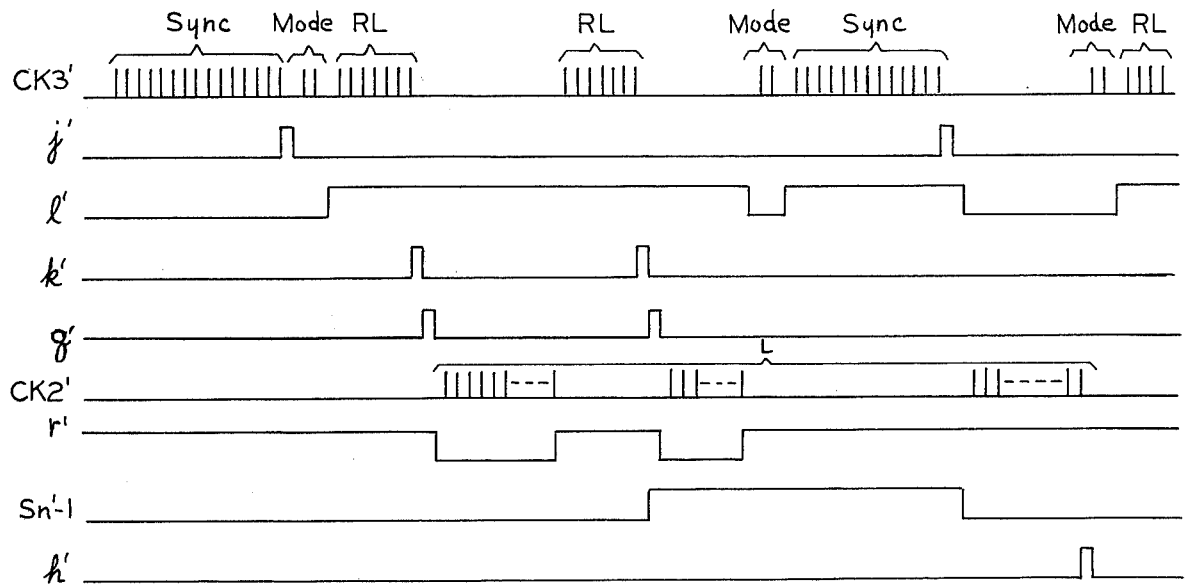

In FIGS. 12a and 12b, the data DT'' is entered into decoder 33 and applied to a mode decoder 311, a run length (RL) decoder 312 and a sync. code detector 313. At first, an enable signal 1' supplied from a decoder controller 318 to the RL decoder is OFF. Only the sync. code detector 313 is in action. Upon entry of a sync. code SOL, detector 313 supplies a sync. code detection signal j' to a decoder control 318. At the same time, upon detection of a sync. code SOL(n), a binary code $N'_2N'_1N'_0$ is supplied representing a level n. This level n refers to a quantization level on the transmitter side, and is used as a density level signal on the receiver side. When a sync. code SOL(7), corresponding to the density level of "7", is detected, two pulses read-out clock pulses CK'3 are supplied from the decoder controller, and a two-bit mode code is read out. The mode decoder 311 decodes the mode signified by the two bits, and supplies it to the decoder controller. The coding rules do not permit an existence of any mode code in the coded data of the density "7" other than "01". If any mode code other than "01" is detected, the decoder controller 318 will continue to send out clock pulses CK'3 until the sync. code detector 313 detects the next SOL(7) (error control). If the mode supplied from the mode decoder 311 is "01", the decoder controller 318 will turn ON the enable signal 1' of the RL decoder 312 and resume sending out CK'3. As it detects an RL code, the RL decoder 312 gives an RL code detection signal k', latches a decoded run length to a run length (RL) register 314 and communicates the detection of the RL code to the decoder controller 318.

The decoder controller 318 sets an arithmetic and logic unit (ALU) control signal m' of cause the complement to the data of the RL register 314 to be supplied to an arithmetic and logic unit (ALU) 315, gives a set pulse q' to an RL counter #2 in order to set the complement therein. Then, controller 318 sets a "0" as a two-level signal data $S'_{n-1}$ which results from the decoding. A write-in clock pulse CK'2 is sent to a line memory 35 (FIG. 11), until a carry signal r' is generated from the RL counter #2. When the carry signal r' is generated, decoder control circuit 318 suspends the supply clock pulses CK'2 and the supply of clock pulses CK'3 is resumed with the enable signal 1' being supplied to the RL decoder 312 which is thereby kept ON. The next RL code is read out. Upon detection of the RL code, the decoded complement of its run length is set in the RL counter #2, conductor $S'_{n-1}$ is set at "1", and a clock pulse CK'2 is sent out until the carry signal r' is generated from the RL counter #2, 316. Next, with the enable signal 1' is turned OFF, two clock pulses CK'3 are given, and the next mode code is read out. Decoding of run length is continued in this manner.

The sync. code detector 313 is always in action. When a sync. code is detected during the sending of a clock pulse CK'3, detector 313 gives a sync. code detection signal j'. Upon receiving the signal j' from the sync. code detector, the decoder controller 318 sets the signal $S'_{n-1}$ at "0", conductor $S'_{n-1}$ at "0" and continues to send sends it out until the sum of the clock pulses CK'2 reaches L, which is the number of pels per scanning line. Controller 318 gives a one-level decode completion signal h', and starts decoding at the next level. Whereas at the density level of "6", and thereafter, the reading of the sync. code SOL, mode code and run length is sequentially accomplished in the same manner. Decoding at these density levels is achieved in the following procedure because the two-level signal of the density level immediately above is referred to. Thus the decoder controller 318:

1. Clears the RL counter #1 by generating a clear pulse p';
2. Gives a clock pulse CK"2 to read out $S'_n$ from the line memory until $S'_n$ shifts from 0 to 1 or until the sum of the pulses of CK"2 reaches L;
3. If, in the step 2. described above, suspension takes places as a result of the sum of the pulses of CK"2 having reached L, controller 318 instructs the same processing thereafter as at the density level of "7" or, in the case of $S'_n$ having shifted from 0 to 1, proceeds to 4 below;
4. Reads out the mode code;
    4-1. If the mode code is "10", the ALU 315 control signal m' is set to cause the ALU to give the complement to the value stored in the RL counter #1, 317, supplies a set pulse q', sets $S'_{n-1}$ at "0", controller 318 sends out clock pulse out CK'2 until the carry signal r' is generated from the RL counter #2 316 in order to write "0" into the line memory.
    4-2. If the mode code is "11", after having read out the following RL code, controller 318 sets the control signal m' to cause an output of (the value of the RL counter #1)+(the value of the RL register) to be given, supplies a set pulse to the RL counter #2, and sets conductor $S'_{n-1}$ at "0" in order to write "0" into the line memory until the carry signal is generated from the RL counter #2, 316. Next, the ALU 315 control signal m' is set to cause the ALU to give the complement to the value stored in the RL register 314, supplies a set signal q' to the RL counter #2, 316, sets conductor $S'_{n-1}$ at "1", and writes "1" into the line memory until the carry signal is generated from the RL counter #2, 316.
    4-3. If the mode code is "01", the same action that what was described with respect to the density level of "7" is performed, and thereafter procedure 4 is re-excuted.
5. Sets conductor $S'_{n-1}$ at "1", supplies clock pulses CK'2 and CK"2, and writes "1" onto conductor $S'_{n-1}$ until conductor $S'_n$ shifts from 1 to 0;
6. Reads out the mode code, and
    6-1. If the mode code is "01", returns to 5;
    6-2. If the mode code is "10", returns to 2, or
    6-3. If the mode code is "11", reads out the following RL code, 315 sets the ALU as control signal m' as to cause the ALU as to give the complement to the value stored in the RL register 314, and supplies a set signal q' to the RL counter #2, 316. It further sets conductor $S'_{n-1}$ at "1", gives a clock pulses CK'2 until the carry signal r' is generated from the RL counter #2, 316, and then returns to 2.

As with the level "7" if, in the above procedure, the sync. code detection signal j' is generated from the sync. code detector 313, the decoder controller 318 writes "0" into the remaining part of the scanning line, generates the one-level decode completion signal h', and proceeds to decoding at the next level.

In FIG. 11, trains of two-level signals decoded in the above-described procedure are supplied to the line memory 35, which is the same as with the line memory in FIG. 8. Memory 35 has three line memory elements 351 through 353, each having a capacity of L bits. After two trains of two-level signals $S'_n$ and $S'_{n-1}$ have been sequentially written into the line memory elements 351 and 352, the two-level signal train $S'_n$ is read out of the line memory element 351 and at the same time another two-level signal train $S'_{n-2}$ is written into the line memory element 353.

Thereafter, each time that decoder 33 sends out the one-line decode completion signal h', line switches 34 and 36 are inverted responsive to a signal f', the oldest memory is eliminated, a new two-level signal train is written in, and the second oldest memory is read out. After the decoder 33 designates the density level designating code $N'_2N'_1N'_0$ and each time a two-level signal train $S''_n$ is read out of the line memory 35, a main controller 40 supplies with a delay density level designating code $N''_2N''_1N''_0$ to a printing circuit 37 circuit 37 then generates a density voltage according to the designated level In response to a one-level scanning start signal d', when the two-level signal $S'_n$ is "1", the density voltage corresponding to "n" is applied to a recording head 39. When signal $S'_n$ is "0", the density voltage is not applied and a resultant electrostatic latent image corresponding to the density level is recorded on recording paper 1.

By reading out a train of two-level signals each time the density voltage is reduced thereafter, one scanning line equivalent of the original picture is reproduced because, in electrostatic recording, the recording density is determined by the maximum concentration voltage in each pel. (Such an equipment is described in a Japanese language paper entitled "Facsimile Capable of Reproducing a Picture Having a Gradation of Multi-level." by T. Takahashi et al. published in The Proceedings of the 7th Conference of the Institute of Visual Image and Electronics (May 1979), pages 1 to 3.).

Figure 13:
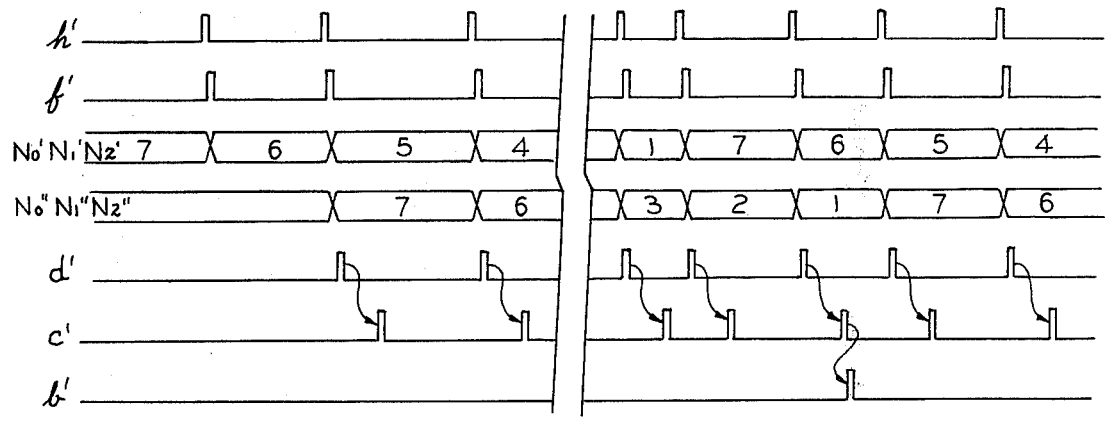
FIG. 13 shows the waveforms of control signals in different parts of FIG. 11.

When a one-level scanning completion signal c' has been given seven times in this, manner, the recording paper 1 is advanced by one between-scanning lines space in response to a signal b'. Recording of every subsequent scanning line is executed in this way. The control procedure for these operations can be readily understood by referring to FIG. 13.

What is claimed is:

1. A system for transmitting digital facsimile signals representing an optical image, said system transmitting half-tone components of said image with reduced redundancy, said system comprising:
    first means for photo-electrically scanning said image in one direction while said image is being shifted in a direction perpendicular to said one direction, in order to provide a video signal including a series of line segments, each of said segments corresponding to one scan by said first means;
    second means for providing a reference signal representative of n reference voltages which cyclically vary in a set of n reference voltages (n being an integer greater than one);
    third means for controlling said first and second means so that each of said line segment video signals is repeated n times while each of said n reference voltages appear sequentially for the duration of a line segment;
    fourth means for comparing said video signal with said reference signal voltages to provide a two-level representation of the difference therebetween; and
    fifth means for converting said two-level representation into a binary representation for transmission with reduced redundancy.

2. A system for the transmission of digital facsimile signals representing an optical image, said system transmitting half-tone components of said picture with reduced redundancy, said system comprising:
    scanning means for photo-electrically scanning said image in one direction while said image is being shifted in a direction perpendicular to said one direction, to provide an analog video signal including a series of line segments, each of said segments corresponding to one scan by said scanning means;
    means for converting said analog video signals into digital video signals;
    a plurality of memory means arranged in parallel, each said memory means storing one line segment portion of said digital video signal;
    means for applying said digital video signal to said memory means with every two adjacent consecutive line segment portions of said digital video signals stored separately in said plurality of memory means;
    means for providing a reference binary signal which is representative of a reference voltage that varies cyclically within a set of n reference voltages (n being an integer greater than one);
    means for controlling said memory means and said reference binary signal providing means to repeatedly read out each of said line segment portions n times while said set of n reference voltages are being sequentially provided, each reference voltage having a duration equal to one line segment;
    means for comparing the output of said memory means with said reference binary signal to provide a two-level representation of the difference therebetween; and
    means for converting said two-level representation into a binary representation for transmission with reduced redundancy.

3. A system for transmitting digital signal representations of an optical image, said system transmitting half-tone components of said image with reduced redundancy, said system comprising:
    means for photo-electrically scanning said image in one direction while said image is being shifted in a direction perpendicular to said one direction, to provide an analog video signal including a series of line segments, each of said line segments corresponding to one scan by said scanning means;
    means for providing a set of n reference voltages (n being an integer greater than one);
    means for comparing said analog video signal with said reference voltages to provide a set of n two-level representations;
    means for selectively enabling one of said n two-level representations to be provided;
    means for controlling said scanning means and said enabling means to cause said scanning means to repeatedly scan the same portion of said image n times while each one of said n reference voltages is being sequentially provided for a duration at one line segment and to cause said enabling means to provide one of said n two-level representations for each said scan; and
    means for converting said two-level representation into a binary representation for transmission with reduced redundancy.

4. A system for transmitting digital facsimile signals as claimed in any one of the claims 1, 2 or 3, wherein said converting means comprises:
    means for detecting signal mode transitions defined by (Sk, Sk-1), each of said transitions providing for a corresponding picture element, where Sk and Sk-1 represent the outputs of said comparing means corresponding respectively to the comparison result of said two-level representations of a picture element with the kth and k-1th ones of said set of n reference voltages (k being not greater then n);

run-length counter means for counting the number of picture elements, said run-length counter means being reset when a predetermined type of said signal mode transition takes place; and means responsive to said run-length counter means for generating a predetermined binary code when said counter reaches a predetermined number or when said predetermined type of signal mode transition takes place.

* * * * *